US010483555B2

(12) United States Patent
Zheng et al.

(10) Patent No.: US 10,483,555 B2
(45) Date of Patent: Nov. 19, 2019

(54) FUEL CELLS USING VERTICALLY FREE STANDING GRAPHENE AND CARBON NANOSHEETS

(71) Applicants: Wei Zheng, Williamsburg, VA (US); Xin Zhao, North Potomac, MD (US)

(72) Inventors: Wei Zheng, Williamsburg, VA (US); Xin Zhao, North Potomac, MD (US)

(*) Notice: Subject to any disclaimer, the term of this patent is extended or adjusted under 35 U.S.C. 154(b) by 0 days.

(21) Appl. No.: 15/374,712

(22) Filed: Dec. 9, 2016

(65) Prior Publication Data

US 2017/0170486 A1 Jun. 15, 2017

Related U.S. Application Data

(60) Provisional application No. 62/266,091, filed on Dec. 11, 2015.

(51) Int. Cl.
| *H01M 4/92* | (2006.01) |
| *H01M 8/0234* | (2016.01) |
| *H01M 4/86* | (2006.01) |
| *H01M 8/1051* | (2016.01) |
| *H01M 8/0213* | (2016.01) |

(52) U.S. Cl.
CPC ......... *H01M 4/926* (2013.01); *H01M 4/8673* (2013.01); *H01M 8/0213* (2013.01); *H01M 8/0234* (2013.01); *H01M 8/1051* (2013.01)

(58) Field of Classification Search
CPC ...... H01M 4/8673; H01M 4/926; H01M 4/96; H01M 8/02; H01M 8/0234; H01M 8/1051

See application file for complete search history.

(56) References Cited

U.S. PATENT DOCUMENTS

| 8,894,886 | B1* | 11/2014 | Luhrs | .................... C01B 32/192 252/378 R |
| 2010/0092809 | A1* | 4/2010 | Drzal | .................. H01M 4/0416 429/413 |
| 2011/0171427 | A1* | 7/2011 | Kim | ........................ B82Y 30/00 428/152 |
| 2013/0034786 | A1* | 2/2013 | Matsumoto | ....... H01M 8/04955 429/429 |
| 2013/0136684 | A1* | 5/2013 | Wu | ........................ B82Y 30/00 423/448 |
| 2014/0302419 | A1* | 10/2014 | Nanba | .................. H01M 8/1004 429/482 |
| 2016/0194460 | A1* | 7/2016 | Humfeld | .................. C08J 5/042 428/408 |
| 2017/0155985 | A1* | 6/2017 | Boesen | .................. H04R 1/023 |

FOREIGN PATENT DOCUMENTS

| CN | 102568853 | * | 7/2012 |
| JP | 2007-335250 | * | 12/2007 |

OTHER PUBLICATIONS

Machine translation of JP 2007-335250, published on Dec. 27, 2007 (Year: 2007).*
Machine translation of CN 102568853, published on Jul. 11, 2012 (Year: 2012).*

* cited by examiner

*Primary Examiner* — Anca Eoff

(57) ABSTRACT

This disclosure is about invention of fuel cells comprising vertically free-standing graphene-containing carbon nanosheets in the components, and methods of making thereof. Performance enhancement effect of the fuel cell is achieved by using vertically free-standing graphene-containing carbon nanosheets as: 1) surface coating of electrically conducting components, 2) and/or a geometric geometric structural supporter of additive catalyst materials, 3) and/or a synergic catalytic nano-composite

5 Claims, 4 Drawing Sheets

FUEL CELLS USING VERTICALLY FREE STANDING GRAPHENE AND CARBON NANOSHEETS

CROSS-REFERENCE TO RELATED APPLICATIONS

This is the Nonprovisional application for a former provisional application with the same title, submitted on Dec. 11, 2015. EFS ID: 24333936, Application Number: 62266091

BACKGROUND

This invention is in the technical field of fuel cell. More particularly, it is in the technical field of manufacturing fuel cell components, and fabrication of fuel cell components incorporating vertically free-standing graphene-containing carbon nanosheets.

A fuel cell is a device that electrochemically converts energy from a fuel into electricity either through reducing positively charged ions (e.g. protons, $H^+$) or via oxidizing a fuel (e.g. hydrogen gas, H2) agent. There are several different types of fuel cells, each using a different chemistry. Fuel cells are usually classified by their operating temperature and the type of electrolyte they use, e.g. proton exchange membrane fuel cell (PEMFC), solid oxide fuel cell (SOFC), alkaline fuel cell (AFC), direct-methanol fuel cell (DMFC), molten-carbonate fuel cell (MCFC), and phosphoric-acid fuel cell (PAFC).

A simplified diagram of a PEMFC is shown in FIG. 1, whose components consists of, but not limited to, an anode 110, a cathode 130, and an electrolyte 120 that allows charged ions to move between cathode and anode. In a PEMFC, the anode and cathode contain catalyst 114 and 134, where the reactions occur. Reactant channel plate 111 conducts fuels (e.g. $H_2$) into the anode. Reactant channel plate 131 conducts oxidizing agent (e.g. air or $O_2$) into the cathode.

In most types of PEMFC, current collectors 112 and 132 are attached to the inner side or outer side of reactant channel plate to collect electrical current generated by the fuel cell.

In some types of fuel cells, e.g. PEMFC, gas diffusion layers (GDL) 113 and 133 are inserted between current collector and catalyst layer to electrically connect the catalyst and current collector.

As one kind of thin film material, a carbon nanosheet is a novel carbon nanomaterial with a graphene and graphitic structure developed by Dr. J. J. Wang et al. at the College of William and Mary. As used herein, a "carbon nanosheet" refers to a carbon nanomaterial with a thickness of two nanometers or less. A carbon nanosheet is a two-dimensional graphitic sheet made up of a single to several layers of graphene. Thus, thickness of a carbon nanosheet can vary from a single graphene layer to multiple layers, such as one to seven layers of graphene. For example, a carbon nanosheet may comprise one to three graphene layers and has thickness of one nanometer or less. Edges of a carbon nanosheet usually terminate by a single layer of graphene. The specific surface area of a carbon nanosheet is between 1000 $m^2/g$ to 2600 $m^2/g$. The height of a carbon nanosheet varies from 100 nm to 20 µm, depending on fabrication conditions. The width of a carbon nanosheet also varies from hundreds of nanometers to a few microns.

A plurality of carbon nanosheets, each of which comprises at least one layer of graphene, are disposed orthogonally to a coated surface of a substrate. Essentially, the plurality of vertically free-standing carbon nanosheets are functioning as space-organizers at nanoscale. By partitioning the space above the surface of the substrate, these vertically free-standing carbon nanosheets can greatly enlarge the surface area of the substrate.

Hereby the term "free-standing" or the term "vertically free-standing" refers to attaching carbon nanostructures to a surface orthogonally, or at various angles from 0 to 180 degree with respect to the surface. Furthermore, carbon nanostructures stretch out not only in a straight way, but also can have a crumpling, tilting, folding, sloping, or "origami"-like structure.

By virtue of their graphene and graphitic structure, carbon nanosheets have very high electrical conductivity. Graphene is known as one of the strongest materials, and it has a breaking strength over 100 times greater than that of a hypothetical steel film of the same thickness. Morphology of carbon nanosheets can remain stable at temperatures up to 1000° C. A carbon nanosheet has a large specific surface area because of its sub-nanometer thickness. Referring to FIG. 4, it shows an exemplary carbon nanosheet consisting of one layer of graphene. With only 1 to 7 layers of graphene, the carbon nanosheet is about 1 nm thick. Its height and length is about 1 micrometer respectively. The structure and fabrication method of carbon nanosheets have been published in several peer-reviewed journals such as: Wang, J. J. et al., "*Free-standing Subnanometer Graphite Sheets*", Applied Physics Letters 85, 1265-1267 (2004); Wang, J. et al., "*Synthesis of Carbon Nanosheets by Inductively Coupled Radio-frequency Plasma Enhanced Chemical Vapor Deposition*", Carbon 42, 2867-72 (2004); Wang, J. et al., "*Synthesis and Field-emission Testing of Carbon Nanoflake Edge Emitters*", Journal of Vacuum Science & Technology B 22, 1269-72 (2004); French, B. L., Wang, J. J., Zhu, M. Y. & Holloway, B. C., "*Structural Characterization of Carbon Nanosheets via X-ray Scattering*", Journal of Applied Physics 97, 114317-1-8 (2005); Zhu, M. Y. et al., "*A mechanism for carbon nanosheet formation*", Carbon, 2007.06.017; Zhao, X. et al., "*Thermal Desorption of Hydrogen from Carbon Nanosheets*", Journal of Chemical Physics 124, 194704 (2006), as well as described by Zhao, X. in U.S. Patent "Supercapacitor using carbon nanosheets as electrode" (U.S. Pat. No. 7,852,612 B2); and Wang, J. et al., in U.S. Patent "Carbon nanostructures and methods of making and using the same" (U.S. Pat. No. 8,153,240 B2), which are incorporated herein by reference in their entirety.

SUMMARY OF THE INVENTION

This invention is a fuel cell, whose components incorporate vertically free-standing graphene-containing carbon nanosheets.

Performance enhancement mechanism of vertically free-standing graphene-containing carbon nanosheets for a fuel cell is based on unique properties of the graphene material: high electrical conductivity, large specific surface, high structural strength, high chemical stability, and large amount of active sites.

The current collectors of a fuel cell, which incorporate vertically free-standing graphene-containing carbon nanosheets on their surface, can reduce inner resistance, hence increase power output and enhance the total efficiency of the fuel cell. In the same way, other components in a fuel cell that need conduct electrical current can also benefit from coating of vertically free-standing graphene-containing carbon nanosheets on the surface.

Vertically free-standing graphene-containing carbon nanosheets can work as a supporting structure for catalyst in a fuel cell. The very large active surface area of vertically free-standing graphene-containing carbon nanosheets can enhance load of mass and efficiency of the catalyst.

Dopants of other atomic elements on vertically free-standing graphene-containing carbon nanosheets can chemically bond to carbon atoms. The doped graphene materials form a low-cost carbon-based catalyst, compared to expensive noble-metal-based catalysts. Meanwhile, the strengthened mechanical structure and effort of high mass loading due to large active surface area of the graphene materials can remain.

Further more, any layer-shaped component of in a fuel cell (e.g. polymer or ceramic films) can be structurally strengthened by integration of vertically free-standing graphene-containing carbon nanosheets. The electrical conductivity of any layers can also be enhanced by embedding vertically free-standing graphene-containing carbon nanosheets.

DETAILED DESCRIPTION OF THE INVENTION

In accordance with techniques of certain exemplary embodiments, a fuel cell adopting vertically free-standing graphene-containing carbon nanosheets, in the cell's components of cathode, anode and electrolyte, is described herein. In the following description, for purpose of explanation, numerous specific details are set forth to provide a thorough understanding of the exemplary embodiments. It will be evident, however, to person skilled in the art that the exemplary embodiments may be practiced without these specific details.

Figure 2:
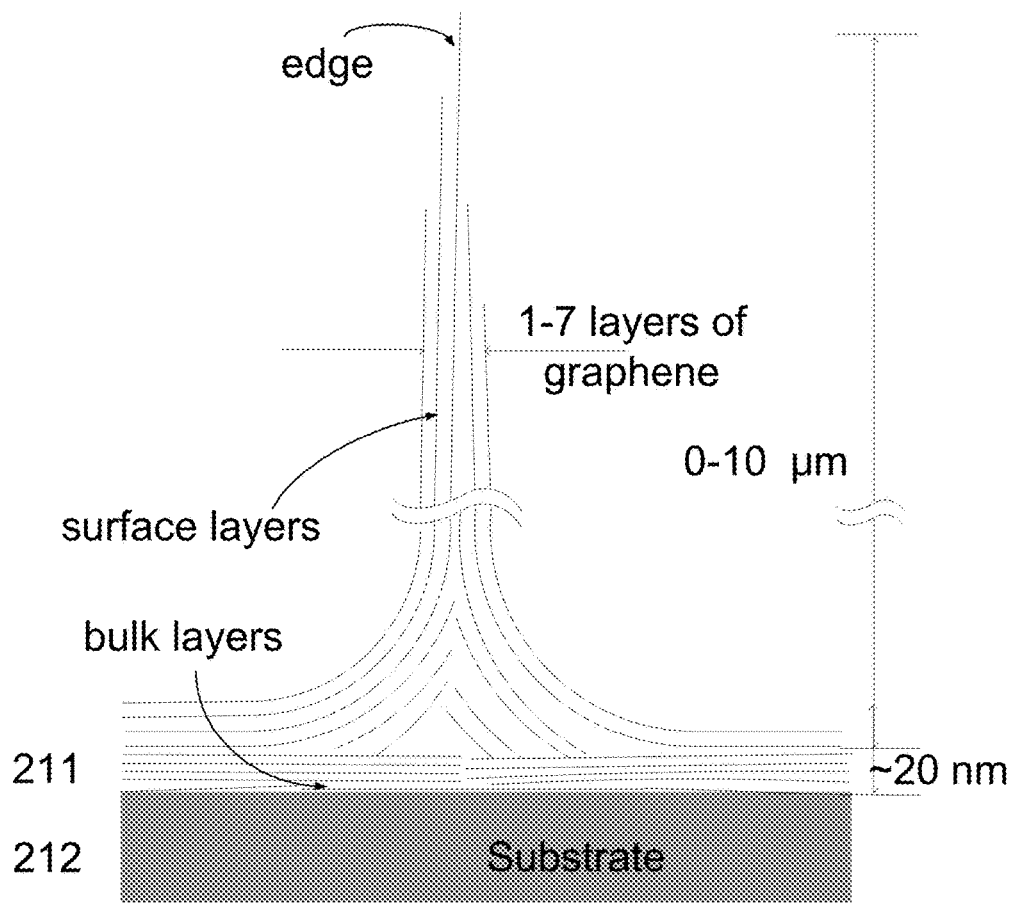
FIG. 2 is a schematic diagram of an exemplary vertically free-standing carbon nanosheet in a cross-sectional view.
Figure 3:
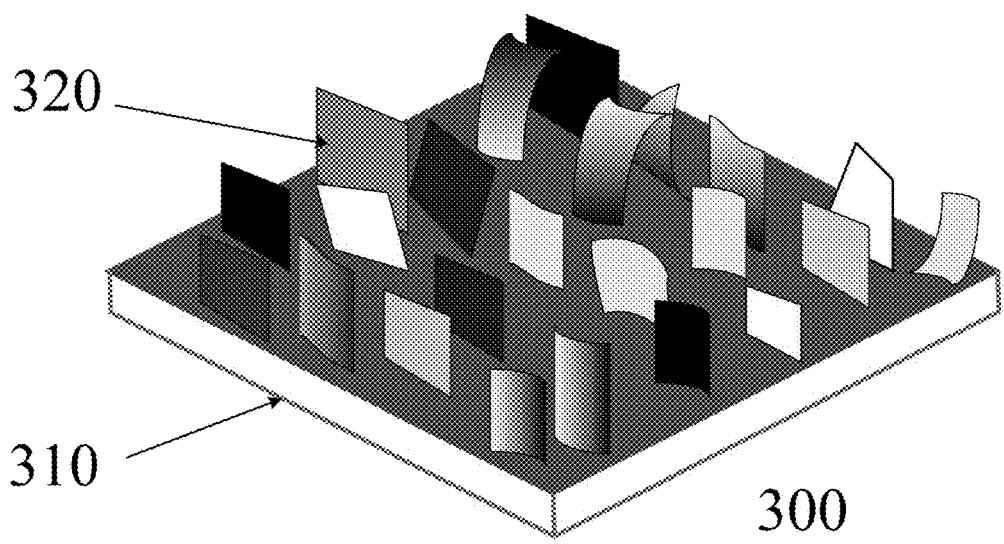
FIG. 3 is a schematic diagram of exemplary vertically free-standing graphene-containing carbon nanosheets directly grown on surface of a solid-state substrate, which could be any layer-shaped components in any types of fuel cells. Surface of the layers/components can achieve excellent electrical conductivity via the graphene materials.

Referring now to the invention in more details, in FIG. 2, it schematically shows a vertically free-standing graphene-containing and carbon nanosheets 211 coated on surface of a solid state substrate 212. In FIG. 3, is shows a surface of fuel cell component 300, where a plurality of vertically free-standing graphene-containing carbon nanosheets 320 coated on surface of a solid state substrate 310. The substrate 310 is made of an electrically conductive material such as copper, nickel, stainless steel, and various metals or alloys.

The substrate 310 can be prepared into various morphologies, such as a foil, a thin film coated on other substrate, a plane structure with holes or a mesh. The surface can be roughened, trenched, etched, foamed or "corrugated" in order to enlarge the active surface area. The substrate 310 can also be a graphite, carbon paper, and carbon cloth.

For the detailed structure of vertically free-standing graphene-containing carbon nanosheets 320, refer to FIG. 2.

A plurality of carbon nanosheets 320 can be incorporated to or grow up in-situ on the substrate 310 through various methods known in prior art such as a thermal chemical vapor deposition method or a Microwave/RF plasma-enhanced chemical vapor deposition method. Surface of the carbon nanosheets 320 can be activated by various methods. Likewise, the density (e.g. spatial density and width/height) of the carbon nanosheets 320 and the attachment geometry between the carbon nanosheets 320 and the substrate 310 may vary. The carbon nanosheets 320 can grow orthogonally on the substrate 310 (e.g. vertically free-standing from surface of the substrate 310). By varying the spatial density of the carbon nanosheets 320, active surface area of the substrate 310 can be modulated. The carbon nanosheets 320 can also be of various sizes, thicknesses, and shapes (width and height). For instance, the carbon nanosheets 320 can have a single layer or multiple layers of graphene.

Figure 1:
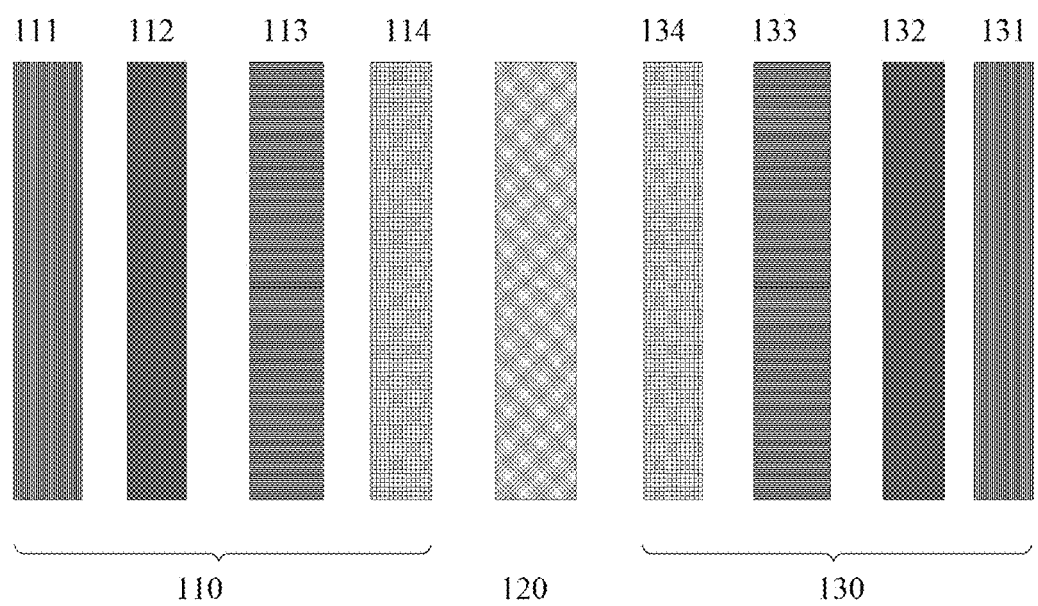
FIG. 1 is a perspective view of a simplified proton exchange membrane fuel cell (PEMFC) in a cross-sectional view.

The first exemplary embodiment is to directly grow up vertically free-standing graphene-containing carbon nanosheets on surface of a component 111 112 113 114 120 134 133 132 131 in a fuel cell for the purpose of enhancing their electrical current conductivity in general. Referring to FIG. 1, based on different functions, the components are defined as: Current Collectors 112 and 132 (CC) which are usually made of metal film and metal mesh; Gas Diffusion Layers 113 and 133 (GDL) which are usually made of a carbon cloth and/or carbon paper; reactant channel plates 111 and 131 (RCP) which is made of graphite and/or metal; Catalyst Layers 114 and 134 (CL), or Proton Exchange Membrane (PEM) layer 120.

In the first exemplary embodiment, the plurality of vertically free-standing graphene-containing carbon nanosheets 320 enhance surface electrical conductivity of a component in general. Especially, on the interface of a component and a fuel (gas or liquid), due to large contact surface, good electrical conductivity of the graphene materials, and more accessibility to catalysts' surface, the structure of vertically free-standing graphene-containing carbon nanosheets 320 can dramatically enhance transport of electrons from the fuel to the cell's external electrical circuit, decrease the inner resistance, hence enhance power, thus, increase totally efficiency of the fuel cell.

The second exemplary embodiment is to directly grow up vertically free-standing graphene-containing carbon nanosheets 420 on a component for the purpose of enhancing performance of catalysts.

Figure 4:
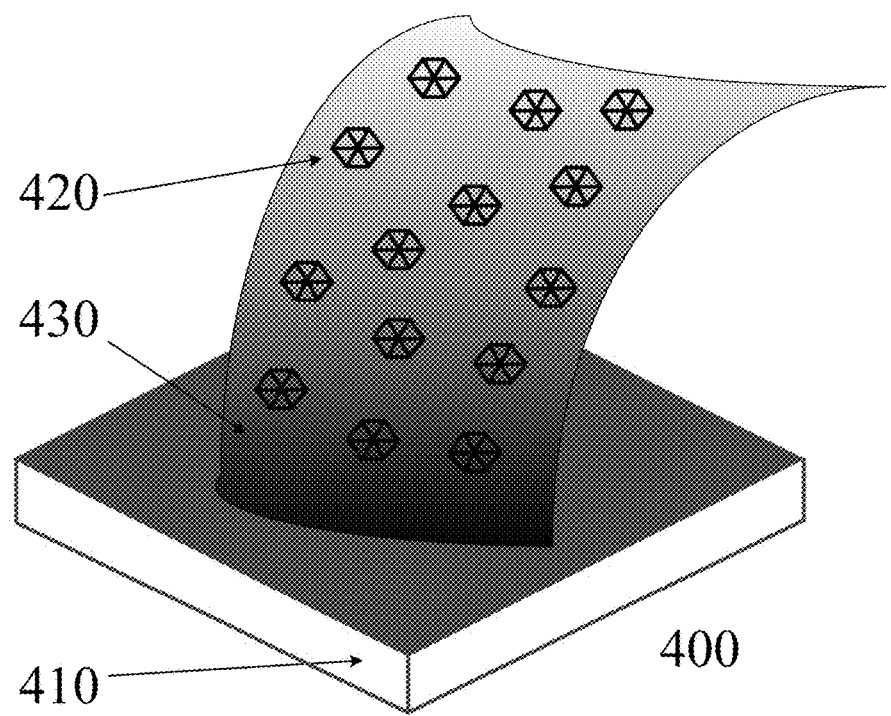
FIG. 4 is a schematic diagram of exemplary catalyst particles disposed on vertically free-standing graphene-containing carbon nanosheets.

Referring to FIG. 4, it shows a schematic diagram of a fuel cell component 400, which comprises of a supporting substrate 410, a plurality of vertically free-standing graphene-containing carbon nanosheets 420, and catalyst particles 430.

Referring to FIG. 1, the anode catalyst 114 breaks down the fuel into electrons and protons, and is usually made of platinum particles. The particles generally have diameters in a few nanometers. The cathode catalyst 134 turns the protons and oxygen into water. The cathode catalyst is often made up of platinum, nickel or other nanomaterial-based catalysts. Contact of catalyst to the reactant (fuel and oxygen) is very important to the reaction, so that space distribution and total surface area of the catalyst particles is more critical than total mass of the catalyst. A good electrical conductivity of catalyst to the supporting structure/component is also important to improve electrical transport of the fuel cell.

In the second exemplary embodiment, the plurality of vertically free-standing graphene-containing carbon nanosheets 420 provides a very large surface area. Further more, due to the properties of vertically free-standing graphene-containing carbon nanosheets 420, they provide a strong mechanical support to the catalyst with high electrical conductivity. The substrate 410 is usually made of but not confined to carbon papers or carbon clothes. It is known in the prior arts that other materials (e.g. metal mesh) can also be used as substrate. The catalyst particle 430 can be metal (e.g. platinum and nickel) particles, metal oxide (e.g. $CoO_2$) particles, or other materials in prior arts. The catalyst particles 430 can be loaded by various methods like vapor deposition, sputtering deposition, electroplating, electrodeposition, printing, paste coating and chemical deposition.

The third exemplary embodiment is to incorporate vertically free-standing graphene-containing carbon nanosheets 420 into a component not suitable for in-situ growth. In the third exemplary embodiment, the vertically free-standing graphene-containing carbon nanosheets 420 with catalyst particles 430 can be peeled off via a film transfer technique, then can be mixed with other material to form an ink-like catalyst paste. Such a composite can be directly applied to surface of a gas diffusion layer or surface of an electrolyte membrane layer to form a catalyst embedded component. Noticeably, in the second embodiment, vertically free-standing graphene-containing carbon nanosheets are grown up in-situ on a fuel cell component. Contrast to the second embodiment, the vertically free-standing graphene-containing carbon nanosheets in the third embodiment are grown up ex-situ of a fuel cell component, then they were incorporated into the fuel component.

Figure 5:
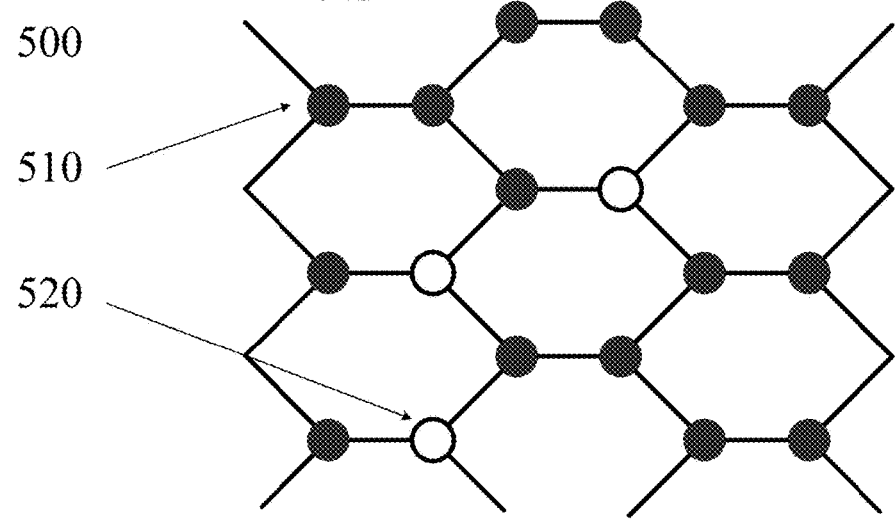
FIG. 5 is a schematic diagram of an exemplary vertically free-standing graphene-containing carbon nanosheets being doped with other elemental atoms in order to form a catalyst.

The fourth exemplary embodiment is to dope vertically free-standing graphene-containing carbon nanosheets with active atoms for the purpose of creating low-cost novel catalyst. Referring to FIG. 5, it shows a schematic diagram that a fuel cell catalyst 500 made of vertically free-standing graphene-containing carbon nanosheets 510 doped with active atoms 520.

Among substitutes for precious metals (e.g. Pt) as a fuel cell catalyst, carbon-based catalysts have a promising future. The dopants of other elements like nitrogen, iodine, sulphur, iron, etc are bonded with carbon atoms. In the fourth exemplary embodiment, the dopant atoms 520 are bonded with the carbon atoms of the vertically free-standing graphene-containing carbon nanosheets 510. The dopant atoms 520 can be bonded in graphene plane of vertically free-standing graphene-containing carbon nanosheets 510 structure as a substitute for the carbon atom. The dopant atoms 520 can also be bonded out of the graphene plane of vertically free-standing graphene-containing carbon nanosheets 510 structure.

Further more, the dopant atoms 520 can be bonded to the edge of vertically free-standing carbon nanosheets 510.

To prepare the catalyst of the fourth embodiment, the ionized atoms of dopant need to be presented during the plasma enhanced chemical vapor deposition process of vertically free-standing graphene-containing carbon nanosheets growth. A high temperature chemical vapor deposition or physical vapor deposition can also bond the dopant atoms to the already formed vertically free-standing graphene-containing carbon nanosheets, especially on the edge.

Figure 6:
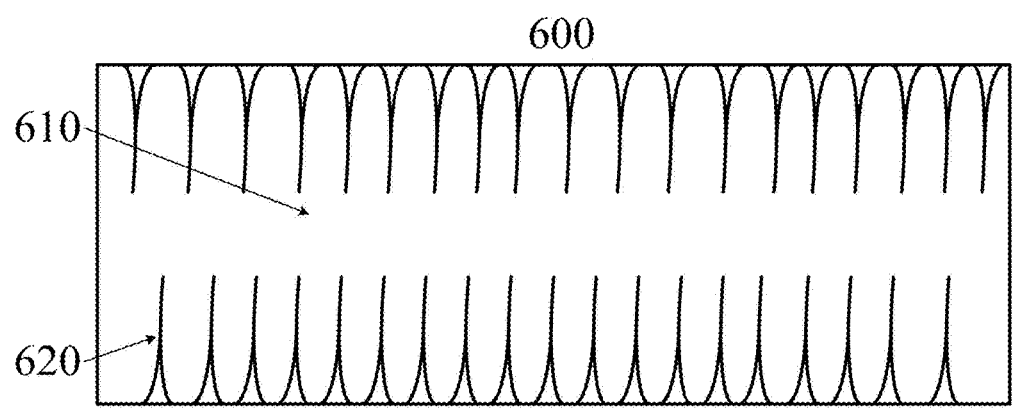
FIG. 6 is a schematic diagram of an exemplary layer in a fuel cell (e.g PEMFC or SOFC) strengthened by a plurality of embedded vertically free-standing graphene-containing carbon nanosheets, in a cross-sectional view.

The fifth exemplary embodiment is to use vertically free-standing graphene-containing carbon nanosheets to strengthen brittle layered-components in a fuel cell, e.g. an electrolyte layer in a fuel cell. The electrolyte layer/component is a proton exchange membrane (PEM) for PEMFC or a Yttria-stabilized Zirconia ceramic layer for solid oxide fuel cell (SOFC). The brittle layers also include the electrode layers in a fuel cell, e.g. anode and cathode layers for a SOFC, which is normally made by ceramic materials. Referring to FIG. 6, it shows a schematic diagram of the fuel cell electrolyte supporting structure 600 comprising of a membrane 610 strengthened by a plurality of vertically free-standing graphene-containing carbon nanosheets 620, in a cross-sectional view.

Benefiting from the high strength and flexibility of the carbon nanosheets, a layer-shaped component embedded with a plurality of vertically free-standing graphene-containing carbon nanosheets 620 becomes much stronger in structure, which makes the layer durable and be able to endure larger temperature shock. Applied to initially brittle materials, such structure is also favorable for the roll-to-roll manufacturing method. For application of the electrolyte layers, the carbon nanosheets embedded membrane is very favorable as a substitute to the expensive Nafion membrane and membranes used in high temperature fuel cell. For application of the electrodes, besides strengthening their mechanical structure, the embedded vertically free-standing graphene-containing carbon nanosheets 620 can also enhance the electrical conductivity for the bulk.

To make the structure described in the fifth exemplary embodiment, the polymer or ceramic material is impregnated into the vertically free-standing graphene-containing carbon nanosheets being grown up on a substrate, by various methods like vapor deposition, sputtering deposition, electroplating, electrodeposition, printing, spraying, paste coating and chemical deposition. After a membrane formation process (e.g. melting and concreting for polymer, annealing for ceramic) is applied, the membrane can be peeled off integrally with assistance of other techniques, like thermal release and ultrasonic release.

The invention claimed is:

1. A fuel cell, comprising:
    a cathode;
    an anode; and
    an electrolyte,
    wherein a plurality of vertically free-standing graphene-containing carbon nanosheets, of which the thickness is 2 nanometers or less, having a base layer of planar one to seven atomic layers graphene materials, having folded and crumpled topological structure, grow up on surfaces of the cathode and/or the anode, by a plasma technology.

2. The fuel cell of claim 1, wherein the plurality of vertically free-standing graphene-containing carbon nanosheets, of which the thickness is 2 nanometers or less, having a base layer of planar one to seven atomic layers graphene materials, having folded and crumpled topological structure, are used as structural supporter of additive catalyst materials.

3. The fuel cell of claim 1, wherein
    the plurality of vertically free-standing graphene-containing carbon nanosheets, of which the thickness is 2 nanometers or less, having a base layer of planar one to seven atomic layers graphene materials, having folded and crumpled topological structure, are doped with atoms, molecules and/or nano-particles, in order to work as a synergic catalytic nano-composite.

4. A gas diffusion layer (GDL) as a component of a fuel cell, which has a plurality of vertically free-standing graphene-containing carbon nanosheets, of which the thickness is 2 nanometers or less, having a base layer of planar one to seven atomic layers graphene materials, having folded and crumpled topological structure, growing up on the GDL surface.

5. A membrane electrode assembly (MEA) as a component of a fuel cell, wherein a plurality of vertically free-standing graphene-containing carbon nanosheets, of which the thickness is 2 nanometers or less, having a base layer of planar one to seven atomic layers graphene materials, having folded and crumpled topological structure, grow up between a gas diffusion layer (GDL) surface and an electrolyte layer.

* * * * *